(12) United States Patent  
Su

(10) Patent No.: US 11,800,075 B2  
(45) Date of Patent: Oct. 24, 2023

(54) ASYMMETRIC IMAGE TRANSMISSION METHOD AND ELECTRONIC DEVICE THEREOF

(71) Applicant: REALTEK SEMICONDUCTOR CORP., Hsinchu (TW)

(72) Inventor: Feng-Shih Su, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 125 days.

(21) Appl. No.: 17/193,751

(22) Filed: Mar. 5, 2021

(65) Prior Publication Data

US 2021/0289183 A1    Sep. 16, 2021

(30) Foreign Application Priority Data

Mar. 10, 2020    (TW) ................................ 109107907

(51) Int. Cl.
| | |
|---|---|
| *H04N 11/20* | (2006.01) |
| *H04N 9/64* | (2023.01) |
| *H04N 1/64* | (2006.01) |
| *G09G 5/00* | (2006.01) |
| *G09G 5/02* | (2006.01) |
| *G09G 5/04* | (2006.01) |

(52) U.S. Cl.
CPC .............. *H04N 9/642* (2013.01); *G09G 5/005* (2013.01); *G09G 5/006* (2013.01); *G09G 5/02* (2013.01); *G09G 5/04* (2013.01); *H04N 1/648* (2013.01); *H04N 9/643* (2013.01)

(58) Field of Classification Search
CPC ........ H04N 9/642; H04N 1/648; H04N 9/643; H04N 11/20; H04N 11/08; H04N 9/64; G09G 5/005; G09G 5/02; G09G 5/04; G09G 5/006; G09G 5/06

USPC .................................. 345/603, 600; 348/558
See application file for complete search history.

(56) References Cited

U.S. PATENT DOCUMENTS

| | | | |
|---|---|---|---|
| 8,358,379 B1 | 1/2013 | Woodall | |
| 10,134,356 B2 * | 11/2018 | Nakajima | ............... G09G 5/006 |
| 10,511,803 B2 * | 12/2019 | Wan | ......................... H04N 7/12 |
| 10,643,298 B2 * | 5/2020 | Chang | .................... G09G 5/363 |
| 2017/0053583 A1 * | 2/2017 | Liu | ........................ G09G 5/006 |
| 2020/0267363 A1 * | 8/2020 | Chen | ...................... G09G 5/005 |

FOREIGN PATENT DOCUMENTS

CN           105898613 A        8/2016

* cited by examiner

*Primary Examiner* — Trang U Tran  
(74) *Attorney, Agent, or Firm* — Birch, Stewart, Kolasch & Birch, LLP

(57) ABSTRACT

An asymmetric image transmission method and an electronic device thereof are provided. The asymmetric image transmission method is applicable to transmission of an image signal from a transmitter to a receiver and includes: modifying, by the transmitter, a first image pixel length in the image signal that conforms to a four-byte mode to a second image pixel length of a three-byte mode; transmitting a plurality of image pixels of the second image pixel length in the three-byte mode respectively through three transmission lanes of a transmission interface; and modifying, by the receiver, the second image pixel length of the image pixels to the first image pixel length of the four-byte mode to obtain the image signal.

10 Claims, 2 Drawing Sheets

ASYMMETRIC IMAGE TRANSMISSION METHOD AND ELECTRONIC DEVICE THEREOF

CROSS-REFERENCE TO RELATED APPLICATION

This non-provisional application claims priority under 35 U.S.C. § 119(a) to Patent Application No. 109107907 filed in Taiwan, R.O.C. on Mar. 10, 2020, the entire contents of which are hereby incorporated by reference.

BACKGROUND

Technical Field

The present disclosure relates to an image transmission technology, and in particular, to an asymmetric image transmission method and an electronic device thereof.

Related Art

A V-by-One data transmission interface is a new mobile equipment display interface that can support a 4K or even 8K or 1K resolution. The interface includes a data signal of a primary lane that transmits image data, and a signal of a secondary lane that transmits an image-related status and control information (HDP hot plugging information, LOCK information, and the like). When a transmitter transmits image data to a receiver through the V-by-One interface, image formats of the transmitter and the receiver need to be the same due to symmetrical transmission. When the data transmission interface performs transmission based on a three-byte mode, corresponding display lanes include only R, G, and B lanes. As a result, the transmitter can transmit only an RGB-format image rather than an ARGB-format image, and the receiver can receive only the RGB-format image. In other words, the ARGB-format image cannot be transmitted by using such a hardware design.

However, the following advantage is brought if the receiver can receive the ARGB-format image: A gradient effect can be achieved for the image to meet a requirement of a customer in designing a user interface. Moreover, since an alpha lane (A lane) in the image has been widely applied to images, there is a need to break the restriction that the ARGB-format image cannot be transmitted in the three-byte mode.

SUMMARY

In view of the above, the present disclosure proposes an asymmetric image transmission method, applicable to transmission of an image signal from a transmitter to a receiver. The asymmetric image transmission method includes: modifying, by the transmitter, a first image pixel length in the image signal that conforms to a four-byte mode to a second image pixel length of a three-byte mode; transmitting a plurality of image pixels of the second image pixel length in the three-byte mode respectively through three transmission lanes of a transmission interface; and modifying, by the receiver, the second image pixel length of the image pixels to the first image pixel length of the four-byte mode to obtain the image signal.

The present disclosure further proposes an electronic device for asymmetric image transmission, including a transmitter, a transmission interface, and a receiver. The transmitter is configured to modify a first image pixel length in an image signal that conforms to a four-byte mode to a second image pixel length of a three-byte mode. The transmission interface is electrically connected to the transmitter, and configured to transmit a plurality of image pixels of the second image pixel length respectively through three transmission lanes. The receiver is electrically connected to the transmission interface, and configured to modify the second image pixel length of the image pixels to the first image pixel length of the four-byte mode to obtain the image signal.

According to some embodiments, the four-byte mode is an ARGB mode; and the three-byte mode is an RGB mode.

According to some embodiments, the three transmission lanes include an R lane, a G lane, and a B lane.

According to some embodiments, a pixel quantity of the first image pixel length*4 is equal to that of the second image pixel length*3.

According to some embodiments, the transmission interface is a V-by-One transmission interface.

Based on the above, in the present disclosure, an image pixel length is modified without changing a hardware design. In this way, an image signal can be transmitted asymmetrically, so that an ARGB-format image can be transmitted in a three-byte mode to display diversified image effects. Therefore, a restriction to asymmetric transmission can be resolved effectively, and costs for hardware modification can be saved.

DETAILED DESCRIPTION

An ARGB-format image uses R, G, and B colors plus an opacity parameter. A color may belong to any R, G, or B color space. The opacity parameter is expressed as an alpha lane (A lane). If an A lane value of a pixel is 0%, the pixel is completely transparent (that is, invisible), and the A lane value being 100% indicates a completely opaque pixel, so that pixels can be displayed through background by using values from 0% to 100%, thereby achieving a gradient display effect (translucency) for an image. Therefore, to display diversified image effects, in the present disclosure, a restriction that an ARGB-format image cannot be transmitted through R, G, and B lanes in a three-byte mode is broken to improve compatibility of a transmission interface, to transmit an RGB-format image and an ARGB-format image.

For example, an image format of a video signal is generally a three-byte mode, and an image format of a user interface (UI) is generally a four-byte mode. To transmit an image signal of the user interface in a video signal transmission interface, an image signal of the four-byte mode needs to be modified to an image signal of the three-byte mode, so that the image signal is transmitted without changing a hardware design.

Figure 1:
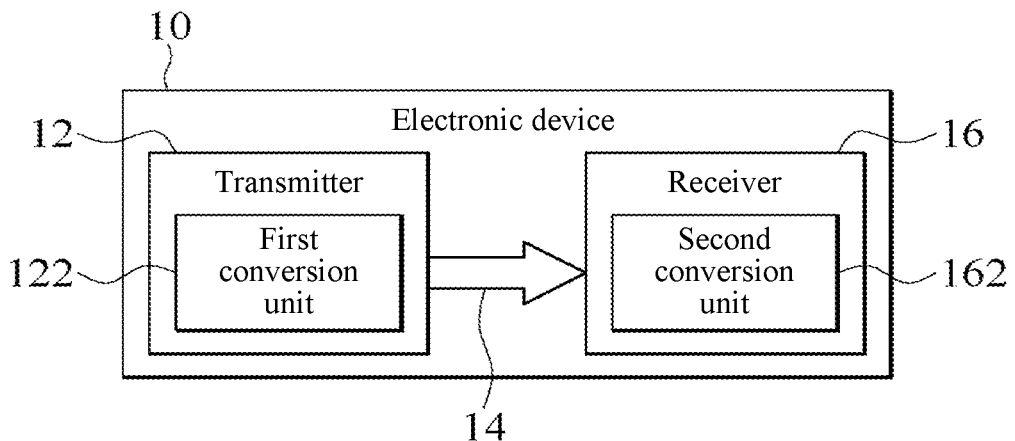
FIG. 1 is a schematic block diagram of an electronic device according to an embodiment of the present disclosure.

FIG. 1 is a schematic block diagram of an electronic device according to an embodiment of the present disclosure. Referring to FIG. 1, an electronic device 10 includes a transmitter 12, a transmission interface 14, and a receiver 16. The transmitter 12 is electrically connected to the transmission interface 14, and the transmission interface 14 is electrically connected to the receiver 16, so that an image is transmitted from the transmitter 12 to the receiver 16 through the transmission interface 14. In an embodiment, the transmitter 12 is a graphic direct memory access (GDMA) chip, the receiver 16 is a write direct memory access (WDMA) chip, and the transmission interface 14 is a V-by-One transmission interface, but the present disclosure is not limited thereto.

Figure 2:
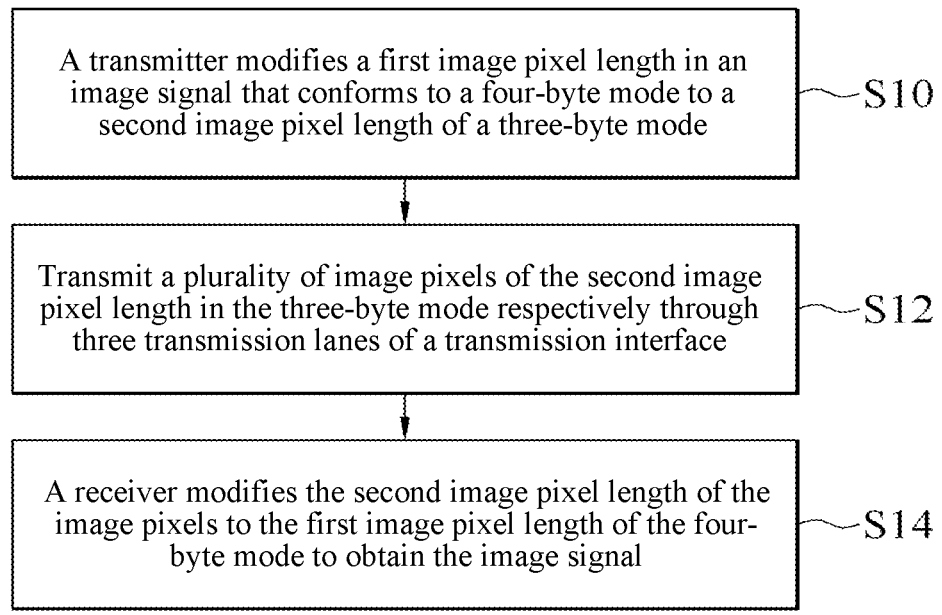
FIG. 2 is a schematic flowchart of an asymmetric image transmission method according to an embodiment of the present disclosure.

FIG. 2 is a schematic flowchart of an asymmetric image transmission method according to an embodiment of the present disclosure. Referring to FIG. 1 and FIG. 2, when the transmitter 12 receives an image signal of a four-byte mode that is an ARGB mode, the asymmetric image transmission method includes the following steps: As shown in step S10, the transmitter 12 modifies a first image pixel length in the image signal that conforms to the four-byte mode to a second image pixel length that conforms to a three-byte mode. The three-byte mode is an RGB mode. The second image pixel length is greater than the first image pixel length. As shown in step S12, a plurality of image pixels of the second image pixel length are transmitted in the three-byte mode respectively through three transmission lanes of the transmission interface 14. For example, the transmission interface 14 includes an R lane, a G lane, and a B lane to transmit the image pixels of the second image pixel length respectively on the R lane, the G lane, and the B lane. Finally, as shown in step S14, after the receiver 16 receives the image pixels of the second image pixel length, the receiver 16 modifies the second image pixel length of the image pixels and restores the image pixels to the first image pixel length that conforms to the four-byte mode to obtain the original image signal. In this way, diversified image effects of the ARGB-format images may be presented at the receiver 16.

Since the four-byte mode has four bits, that is, A, R, G, and B, and the three-byte mode has three bits, that is, R, G, and B. When a same total quantity of image pixels is transmitted, the second image pixel length is greater than the first image pixel length, and a pixel quantity of the first image pixel length*4 is equal to that of the second image pixel length*3.

In an embodiment, the transmitter 12 further includes a first conversion unit 122. The transmitter 12 modifies the first image pixel length of the four-byte mode to the second image pixel length that conforms to the three-byte mode by using the first conversion unit 122. The receiver 16 further includes a second conversion unit 162. The receiver 16 modifies the second image pixel length of the image pixels to the first image pixel length that conforms to the four-byte mode by using the second conversion unit 162 to restore the image pixels to the original image signal.

Figure 3:
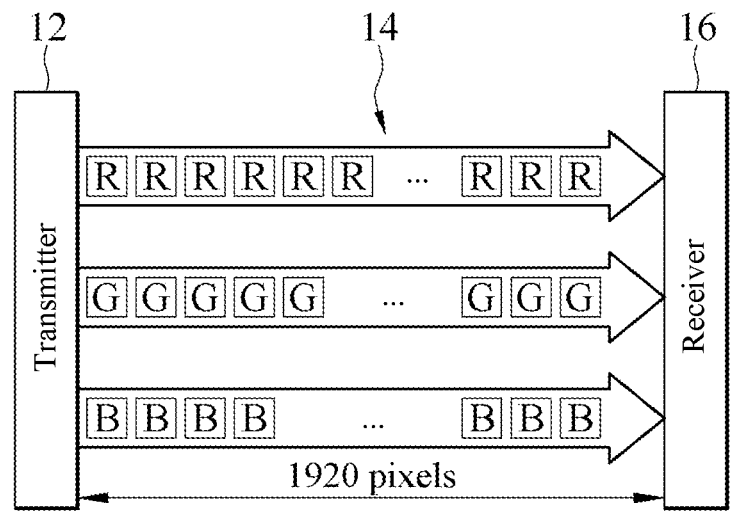
FIG. 3 is a schematic transmission diagram of transmission of an RGB-format image according to an embodiment of the present disclosure.

In an embodiment, FIG. 3 is a schematic transmission diagram of transmission of an RGB-format image according to an embodiment of the present disclosure. Referring to FIG. 1 and FIG. 3, an image signal of an RGB-format image is transmitted in an RGB mode, the transmitter 12 transmits a plurality of image pixels of a same image pixel length respectively through the transmission lanes (the R lane, the G lane, and the B lane) of the transmission interface 14. In this case, the image pixel length does not need to be modified, and the image pixel length is 1920 pixels. Each row of image pixels is transmitted to the receiver 16 through the transmission interface 14. The receiver 16 receives the image pixels of the same image pixel length to obtain the image signal of the RGB-format image.

Figure 4:
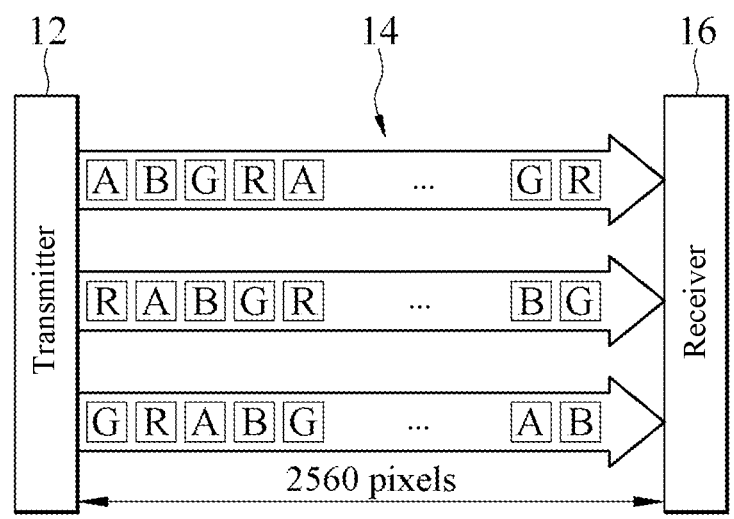
FIG. 4 is a schematic transmission diagram of transmission of an ARGB-format image according to an embodiment of the present disclosure.

In an embodiment, FIG. 4 is a schematic transmission diagram of transmission of an ARGB-format image according to an embodiment of the present disclosure. Referring to FIG. 1 and FIG. 4, when an ARGB-format image is transmitted in an RGB mode, an image signal originally received by the transmitter 12 is a plurality of rows of image pixels of a first image pixel length that conform to an ARGB mode. In this case, the first image pixel length is 1920 pixels (a total quantity of image pixels is 1920*4=7680 pixels). To transmit the image signal in the transmission interface 14 of the RGB mode, the first conversion unit 122 of the transmitter 12 modifies all the image pixels from the first image pixel length of the ARGB mode to a second image pixel length of the RGB mode, as shown in Table 1. Since the image pixels are transmitted only on the R lane, the G lane, and the B lane in the RGB mode, the image pixel length is increased. In this case, the second image pixel length is 2560 pixels (a total quantity of image pixels is 2560*3=7680 pixels). Moreover, the image pixels of the second image pixel length are transmitted to the receiver 16 in the RGB mode respectively through the three transmission lanes of the transmission interface 14. That is, image pixels (ABGRABGR . . . ) of the second image pixel length are transmitted on the R lane, image pixels (RABGRABG . . . ) of the second image pixel length are transmitted on the G lane, and image pixels (GRABGRAB . . . ) of the second image pixel length are transmitted on the B lane, to transmit an entire row of image pixels. After the receiver 16 receives the image pixels of the second image pixel length, the second conversion unit 162 of the receiver 16 modifies all the image pixels from the second image pixel length of the RGB mode back to the first image pixel length of the ARGB mode, as shown in Table 2. In this case, the second image pixel length of 2560 pixels may be modified and restored to the first image pixel length of 1920 pixels, and the image signal obtained by the receiver 16 is an ARGB-format image. Therefore, the image signal of the ARGB-format image can be successfully transmitted to the receiver 16 from the transmitter 12 through the transmission interface 14 of the RGB mode in the above manner of modifying the image pixel length. In this way, the ARGB-format image can be transmitted by using hardware with fewer display lanes, and the ARGB-format image can be displayed at the receiver 16.

TABLE 1

Format of image pixels output from the transmitter

| | pixel0 | pixel1 | pixel2 | pixel3 | pixel4 | pixel5 | pixel6 | pixel7 |
|---|---|---|---|---|---|---|---|---|
| A lane | 0 | 0 | 0 | 0 | 0 | 0 | 0 | 0 |
| R lane | A | B | G | R | A | B | G | R |
| G lane | R | A | B | G | R | A | B | G |
| B lane | G | R | A | B | G | R | A | B |

TABLE 2

Format of image pixels after conversion by the receiver

| | pixel0 | pixel1 | pixel2 | pixel3 | pixel4 | pixel5 |
|---|---|---|---|---|---|---|
| A lane | A | A | A | A | A | A |
| R lane | R | R | R | R | R | R |

TABLE 2-continued

Format of image pixels after conversion by the receiver

|  | pixel0 | pixel1 | pixel2 | pixel3 | pixel4 | pixel5 |
|---|---|---|---|---|---|---|
| G lane | G | G | G | G | G | G |
| B lane | B | B | B | B | B | B |

Therefore, in the present disclosure, an image pixel length is modified without changing a hardware design. In this way, an image signal can be transmitted asymmetrically, so that an ARGB-format image can be transmitted by using hardware in a three-byte mode to display diversified image effects. Therefore, a restriction to asymmetric transmission can be resolved effectively, and costs for hardware modification can be saved.

Although the present disclosure has been described in considerable detail with reference to certain preferred embodiments thereof, the disclosure is not for limiting the scope of the present disclosure. Persons having ordinary skill in the art may make various modifications and changes without departing from the scope and spirit of this application. Therefore, the scope of the appended claims should not be limited to the description of the preferred embodiments described above.

What is claimed is:

1. An asymmetric image transmission method, applicable to transmission of an image signal from a transmitter to a receiver, comprising:
    modifying, by the transmitter, a first image pixel length in the image signal that conforms to a four-byte mode to a second image pixel length of a three-byte mode;
    transmitting a plurality of image pixels of the second image pixel length in the three-byte mode respectively through three transmission lanes of a V-by-One transmission interface; and
    modifying, by the receiver, the second image pixel length of the image pixels to the first image pixel length of the four-byte mode to obtain the image signal;
    wherein the transmitter is a graphic direct memory access (GDMA) chip, and the receiver is a write direct memory access (WDMA) chip.

2. The asymmetric image transmission method according to claim 1, wherein the four-byte mode is an ARGB mode; and the three-byte mode is an RGB mode.

3. The asymmetric image transmission method according to claim 1, wherein the three transmission lanes comprise an R lane, a G lane, and a B lane.

4. The asymmetric image transmission method according to claim 1, wherein a pixel quantity of the first image pixel length*4 is equal to that of the second image pixel length*3.

5. An electronic device for asymmetric image transmission, comprising:
    a transmitter, configured to modify a first image pixel length in an image signal that conforms to a four-byte mode to a second image pixel length of a three-byte mode;
    a V-by-One transmission interface, electrically connected to the transmitter, and configured to transmit a plurality of image pixels of the second image pixel length in the three-byte mode respectively through three transmission lanes; and
    a receiver, electrically connected to the V-by-One transmission interface, and configured to modify the second image pixel length of the image pixels to the first image pixel length of the four-byte mode to obtain the image signal;
    wherein the transmitter is a graphic direct memory access (GDMA) chip, and the receiver is a write direct memory access (WDMA) chip.

6. The electronic device for asymmetric image transmission according to claim 5, wherein the four-byte mode is an ARGB mode; and the three-byte mode is an RGB mode.

7. The electronic device for asymmetric image transmission according to claim 5, wherein the three transmission lanes comprise an R lane, a G lane, and a B lane.

8. The electronic device for asymmetric image transmission according to claim 5, wherein a pixel quantity of the first image pixel length*4 is equal to that of the second image pixel length*3.

9. The electronic device for asymmetric image transmission according to claim 5, wherein the transmitter further comprises a first conversion unit, configured to modify the first image pixel length of the four-byte mode to the second image pixel length of the three-byte mode.

10. The electronic device for asymmetric image transmission according to claim 5, wherein the receiver further comprises a second conversion unit, configured to modify the second image pixel length of the image pixels to the first image pixel length of the four-byte mode.

* * * * *